US007813531B2

(12) United States Patent
Becker

(10) Patent No.: US 7,813,531 B2
(45) Date of Patent: Oct. 12, 2010

(54) METHODS AND APPARATUS FOR CLUSTERING TEMPLATES IN NON-METRIC SIMILARITY SPACES

(75) Inventor: Glenn C. Becker, Alexandria, VA (US)

(73) Assignee: Unisys Corporation, Blue Bell, PA (US)

( * ) Notice: Subject to any disclaimer, the term of this patent is extended or adjusted under 35 U.S.C. 154(b) by 1199 days.

(21) Appl. No.: 11/416,503

(22) Filed: May 1, 2006

(65) Prior Publication Data
US 2007/0253624 A1 Nov. 1, 2007

(51) Int. Cl.
*G06K 9/62* (2006.01)
(52) U.S. Cl. .................. 382/115; 382/124; 382/218; 382/225
(58) Field of Classification Search ............... 382/209, 382/217, 218, 224, 225, 226, 227, 115, 118, 382/124, 125
See application file for complete search history.

(56) References Cited

U.S. PATENT DOCUMENTS

| 6,041,133 | A | 3/2000 | Califano et al. |
|---|---|---|---|
| 6,047,281 | A | 4/2000 | Wilson et al. |
| 6,070,159 | A | 5/2000 | Wilson et al. |
| 6,148,295 | A | 11/2000 | Megiddo et al. |
| 6,282,304 | B1 | 8/2001 | Novikov et al. |
| 6,546,122 | B1 | 4/2003 | Russo |
| 6,594,392 | B2 | 7/2003 | Santoni |
| 6,845,377 | B2 | 1/2005 | Yamane et al. |
| 6,876,757 | B2 | 4/2005 | Yau et al. |
| 6,961,452 | B2 | 11/2005 | Fujii |
| 6,973,206 | B2 | 12/2005 | Lo |
| 2002/0031245 | A1 | 3/2002 | Rozenberg et al. |
| 2003/0210808 | A1 | 11/2003 | Chen |
| 2004/0062427 | A1* | 4/2004 | Biswas et al. ............... 382/125 |
| 2007/0112754 | A1* | 5/2007 | Haigh et al. .................... 707/5 |
| 2007/0248249 | A1* | 10/2007 | Stoianov ..................... 382/124 |

OTHER PUBLICATIONS

Du, Q., et al.: "Centroidal Voronoi Tesselations: Applications and Algorithms," Siam Review, vol. 41, No. 4, 1999, pp. 637-676.

Schoenberg: "Tesselations," Encyclopedia of Enviromentrics, [Online], 2002, Retrieved from: www.stat.ucla.eud/}frederic/papers/tesselations.pdf on Nov. 22, 2007, Wiley, NY.

(Continued)

*Primary Examiner*—Jon Chang
(74) *Attorney, Agent, or Firm*—James E. Goepel

(57) ABSTRACT

Clustering biometric templates is performed by determining fiduciary templates and cluster seed templates, both from a gallery of biometric templates. Similarity vectors are formed by comparing members of the cluster seed templates to the fiduciary templates. The gallery is then partitioned into clusters based upon the similarity vectors, and the clusters are populated from the remainder of the gallery. Partitioning may be performed by a classifier that implements a supervised machine learning algorithm that is trained with the similarity vectors, such as a multi-decision tree classification system. Matching may be accommodated by accessing a probe template, determining a cluster neighborhood for the probe template, and searching the cluster neighborhood to determine whether the gallery includes a match corresponding to the probe template. The same similarity metric is used both to partition a gallery into clusters, and in matching a probe template to the so-clustered gallery.

6 Claims, 8 Drawing Sheets

OTHER PUBLICATIONS

Jacobs, D., et al.: Classification with Nonmetric Distances: Image Retrieval and class Representation, PAMI, vol. 22, No. 6, Jun. 2000, pp. 583-600.

Pekalska, et al.: "Prototype Selection for Dissimilarity-Based Classifiers", Pattern Recognition, vol. 39, No. 2, Feb. 2006, pp. 189-208.

Chevaleyre, et al., "Solving Multiple-Instance and Multiple-Part Learning Problems with Decision Trees and Rule Sets", Advances in Artificial Intelligence, (Lecture Notes in Artificial Intelligence vol. 2056), Springer-Verlag Berlin, Germany, 2001, pp. 204-214.

Goh King-Shy, et al.: "DynDex: A Dynamic and Non-Metric Space Indexer", Proceedings of the ACM International Multimedia Conference and Exhibition 2002, pp. 466-475.

Chang E et al: "Clustering for Approximate Similarity Search in High-Dimensional Spaces", IEEE Transactions on Knowledge and Data Engineering, IEEE Service Center, Los Alamitos, CA, US, vol. 14, No. 4, Jul. 2002, pp. 792-808, XP011094605, ISSN: 1041-4347; p. 792, left-hand column, par. 1; p. 792, right-hand column, par. 1, *sec. 3.4*; p. 799, left-hand column, *sec. 3.1*; p. 795, right-hand column—797, left-hand column.

\* cited by examiner

METHODS AND APPARATUS FOR CLUSTERING TEMPLATES IN NON-METRIC SIMILARITY SPACES

BACKGROUND OF THE INVENTION

1. Field of the Invention

This invention relates generally to biometric matching and more particularly to clustering biometric templates for efficient biometric matching.

2. Description of the Related Art

Conventional biometric matching algorithms typically require an exhaustive search of all templates to discover matches. This exhaustive search is inherently inefficient. To reduce the search time, parallel processing and hierarchical filtering approaches have been used.

Hierarchical filtering uses multiple filters that use different biometric features to incrementally reduce the number of candidate templates that need to be searched by each subsequent matching algorithm. The first filter uses the fastest but least precise matching algorithm generally based upon some gross feature in the biometric. Subsequent filters use increasingly precise, but ever slower, matching algorithms to reduce the set of biometric candidates down to the final match set.

A problem with hierarchical filtering is that different features are used for filtering than are used for the final match. This inconsistency introduces inefficiency because the filtering algorithms need to allow more candidates through to the next level.

The biometric search space may also be clustered to seek greater efficiency in the matching process. That is, biometric templates are clustered together based upon their possession of certain features. However, existing efforts to cluster biometric search spaces have been largely unsuccessful. This is likely attributable to the biometric space tending to be non-metric, which means that the triangle inequality rule does not hold, because of the fuzzy matching algorithms used to compare the features. Traditional clustering algorithms such as k-means and self organizing maps are based on distance or similarity measures. This is problematic because these algorithms assume a metric or near-metric space, and they are less effective as the space becomes less metric.

Another reason for the ineffectiveness of existing biometric clustering techniques is that one set of features is used for clustering and a different set of features is used for matching, which leads to inconsistencies. For example, an initial filtering during a matching process may be based upon the determination that a probe template includes a particular gross feature. The database of templates is then coarsely filtered based upon that particular feature. Then, additional matching algorithms that focus on different features are applied to the remaining templates (i.e., those remaining following coarse filtering) to attempt to produce a match. The problem with this approach is that the coarse filtering may be both over and under-inclusive. That is, it may filter out some viable matching candidates, or may include so many potential matches that the overall efficiency of the matching process is not adequately advanced by the coarse filtering phase.

What is needed is biometric clustering that is more efficient than conventional clustering or filtering algorithms, such as those implementing hierarchical filtering and ineffective clustering techniques.

SUMMARY OF THE INVENTION

The present invention provides improved partitioning of biometric templates into clusters, and improved matching of probe templates to a gallery of biometric templates partitioned into clusters.

According to one aspect, clustering biometric templates includes initially determining a set of fiduciary templates from a gallery of biometric templates. If desired, the set of fiduciary templates may be determined based upon random selection from the gallery or may be artificially created. Multiple candidate sets may also be examined to optimize intra-set dispersion. Cluster seed templates are then determined from the gallery of biometric templates. These templates may also be selected at random from the gallery. The membership of the set of cluster seed templates is preferably large in number as compared to that of the fiduciary templates. Once the fiduciary and cluster seed templates are identified, similarity vectors are formed by comparing members of the cluster seed templates to the fiduciary templates. Individual similarity vectors indicate the similarity of a given cluster seed template to respective ones of the fiduciary templates. The gallery is then partitioned into clusters based upon the plurality of similarity vectors, and the clusters are populated using the remainder of the gallery (the templates that remain, other than the fiduciary and cluster seed templates).

The partitioning may be performed by applying a classifier to the plurality of similarity vectors. One example of a classifier implements a supervised machine learning algorithm that is trained with the similarity vectors, such as a multi-decision tree classification system. In this example, matching may be accommodated by accessing a probe template and determining a set of leaf nodes that the probe template is assigned to according to the multi-decision tree classification system. Then, the cluster neighborhood for the probe template is determined to be those members of the gallery of biometric templates that are assigned to the set of leaf nodes. This cluster neighborhood is then searched to try to identify a match corresponding to the probe template.

The present invention is applicable to any non-metric similarity or dissimilarity space, which may include biometric or non-biometric spaces. An example of a biometric is fingerprint information.

According to another aspect of the present invention, the same similarity metric is used both to partition a gallery into clusters, and in matching a probe template to the so-clustered gallery. This may comprise accessing a gallery of biometric templates partitioned into clusters according to a particular similarity metric. The probe template is accessed (e.g., by scanning a fingerprint of an individual, etc.). Then the gallery is filtered based upon the probe template using the same particular similarity metric that was used to partition the gallery into clusters, which provides a cluster neighborhood for the probe template. The templates in the cluster neighborhood are then searched exhaustively to determine one or more potential matches for the probe template.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Figure 1A:
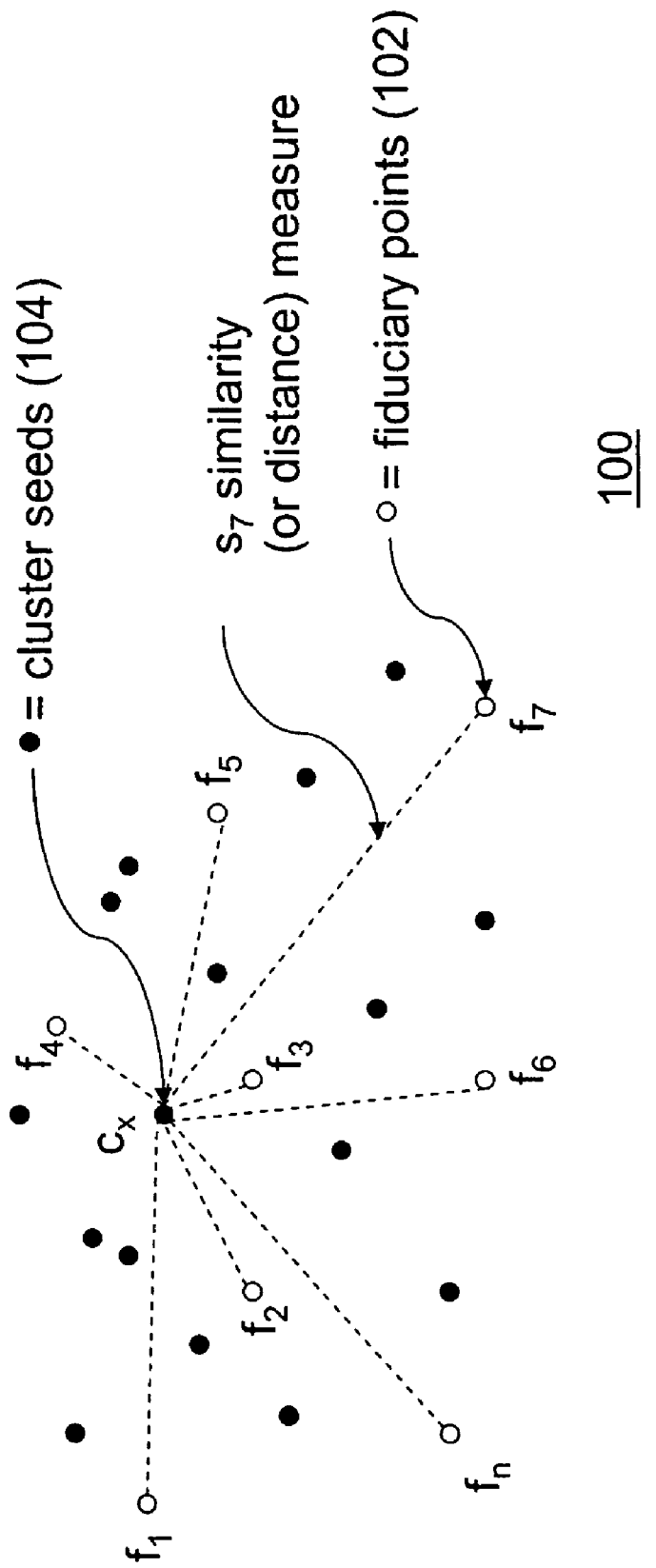
FIGS. 1A-D are schematic diagrams that illustrate clustering a non-metric similarity space in accordance with an embodiment of the present invention.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The following description offers a detailed example of clustering a non-metric space, particularly one based upon fingerprint data.

Although fingerprint data is primarily described, such is for ease of description and is only one example of a non-metric space that may be clustered and searched in accordance with the present invention. Other biometric data including but not limited to retinal, voice, DNA, facial characteristic, iris, knuckle, and vein may also be clustered and searched in accordance with the present invention. Additionally, the present invention may be applied to any non-metric type of data, including non-biometric data such as social network analysis or document retrieval applications.

The present invention is also applicable to a variety of applications. Matching a subject to a clustered gallery may be for identification of an individual, or for authentication or "credentialing" an individual. Site applications include but are not limited to airport security, border crossings, office buildings, and point-of-sale terminals.

To cluster in an n-dimensional non-metric (biometric similarity) space comprising a gallery of templates, instead of basing each template's position relative to a cluster on its distance from a cluster's center, the present invention uses a template's relative similarity to some number of randomly selected fiduciary templates. This set of similarities then forms a vector that can be used to determine cluster membership. For a given probe, a location and cluster membership may then be determined, with searching aimed at the cluster or neighborhood of clusters corresponding to the given probe.

In one embodiment, the clustering process initially determines a set of fiduciary templates from a gallery of templates. A set of cluster seed templates is also determined from the gallery, and preferably has a membership that is large relative to the set of fiduciary templates. Similarity vectors are formed by comparing members of the set of cluster seed templates to the set of fiduciary templates. Each similarity vector indicates the similarity of a given member of the set of cluster seed templates to respective ones of the set of fiduciary templates. These similarity vectors are then used to determine the membership of all of the templates that comprise the gallery.

Conventional techniques may be used to build a gallery of templates to be clustered. For example, standard scanning and feature extraction may be implemented to acquire a digital representation of the fingerprint data corresponding to given individuals, which may also be organized according to finger type, presence of patterns, minutia and/or other characteristics. A full set of data for a given person may be referred to as a profile, which in turn may include one or more templates. Of course, the data for the gallery does not need to be collected individually, as databases of such information are readily available for acquisition or access.

FIGS. 1A-D are schematic diagrams that illustrate clustering a non-metric similarity space in accordance with an embodiment of the present invention. The fiduciary template set is preferably composed based upon random selection of templates from the gallery. It may also be artificially created. Many candidate fiduciary sets can be tested to find the one with the greatest intra-set dispersion, which is likely to produce the most orthogonal set of fiduciaries and hence the best clustering results. Intra-set dispersion may be approximated by adding up the pair-wise distances between individual fiduciary templates in a set. This can be done for each of a series of candidate fiduciary template sets. Then, the candidate set with the largest distance sum is selected as being the one believed to have optimal dispersion.

FIGS. 1A-D are provided to conceptually illustrate clustering the non-metric space. By necessity, the points in FIG. 1A appear to have a spatial distribution as shown. However, it should be appreciated that the triangle inequality rule does not hold in non-metric spaces. That is, in a non-metric space the distances between a given point (A) and two other points (B, C) does not necessarily result in the distance between those two other points (BC) being less than the sum of those distances (AB+AC).

FIG. 1A is a schematic diagram illustrating a set of fiduciary templates F ($f_1$ through $f_n$) in a non-metric similarity space 100. The number of templates (n) in the fiduciary set F is a parameter that can be determined experimentally before clustering. In determining the number, there is essentially a trade-off between efficiency and accuracy. The number will also depend upon the type of biometric and template being clustered.

Another random set of templates, distinct from the set of fiduciary templates F, is also selected from the gallery to serve as a set of cluster seed templates, or cluster points (C, denoted as 104 in FIG. 1A). The selection of C membership is preferably random, with membership numbers being much larger than those for F. By randomly selecting C from the gallery its distribution should be similar to that of the gallery. This means that in regions where the gallery is densely populated C should form more clusters than in regions where the gallery is sparsely populated.

Similarity vectors are then formed by comparing members of the set of cluster seed templates to the set of fiduciary templates. Each similarity vector indicates the similarity of a given cluster seed template to respective ones of the set of fiduciary templates. The location of any cluster seed template $L(c_x)$ can be defined according to the similarity vector $\text{sim}(c_x, F)$, as described in the following equation:

$$L(c_x) = \text{sim}(c_x, F) = \{s_1, s_2, s_3, \ldots, s_m\}, \tag{Eq. 1}$$

where $s_i$ is the similarity or distance measure between $c_x$ and $f_i$ for each of the n fiduciary templates. The distance is generated according to whatever biometric matching algorithm is used. One useful feature of the present invention is that the matching efficiency advantages are realized regardless of the type of algorithm that is used. Examples of algorithms that may be used include but are not limited to Bozorth, NEC, Cogent, SAGEM, and Identix.

Figure 1B:
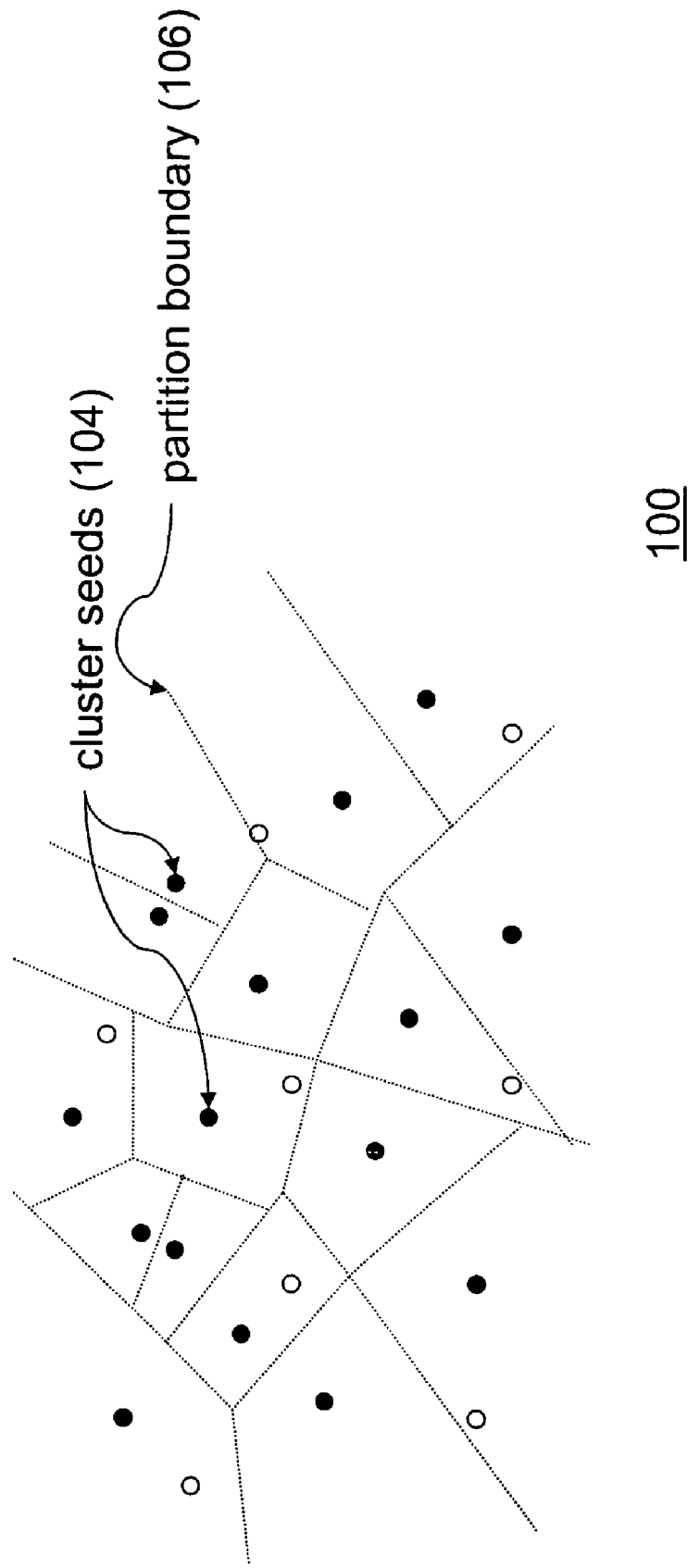

After the locations of the cluster seed templates are determined, the space is partitioned, or clustered. FIG. 1B is a schematic diagram conceptually illustrating partition boundaries 106 for the non-metric similarity space 100.

The partitioning may be performed by applying a classifier to the similarity vectors, such as one that implements a supervised machine learning algorithm that is trained with the set of similarity vectors.

One example of a classifier implements a multi-decision tree classification system such as Random Forests® as distributed by Salford Systems, of San Diego, Calif., or Learning Forests® as developed by Unisys, of Blue Bell, Pa. With the multi-decision tree classification system, each member of C is assigned to a leaf node in each decision tree in the forest.

The cluster boundaries 106 are indicated as discrete, static lines. However, many classifiers may provide "fuzzy" boundaries such that some templates may reside within multiple clusters.

Figure 1C:
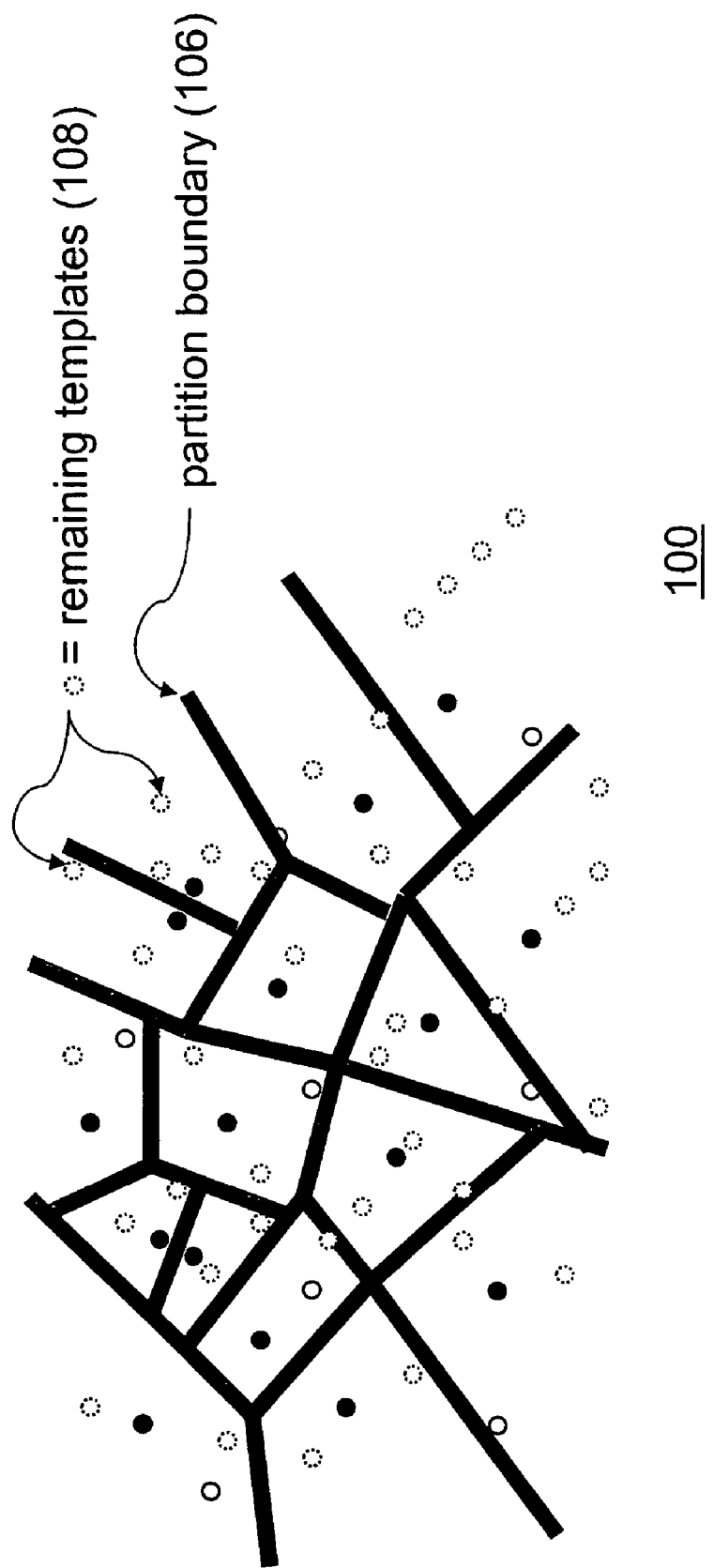

The clusters are then fully populated by determining the cluster membership for the remaining templates in the gallery. As indicated in FIG. 1C, the non-metric similarity space 100 is partitioned as previously described, but new templates 108 are introduced into respective clusters. Preferably, the same methodology that was used for determining the cluster boundaries 106 from the cluster seed templates is used to populate the clusters from the remainder of the gallery. The classification system generally uses what is learned during the clustering stage to populate the clusters from the gallery. Where a multi-decision tree classification system is implemented, the remainder of the gallery is populated by finding the leaf nodes where each template in the gallery is assigned by using the classification system in test mode.

Figure 1D:
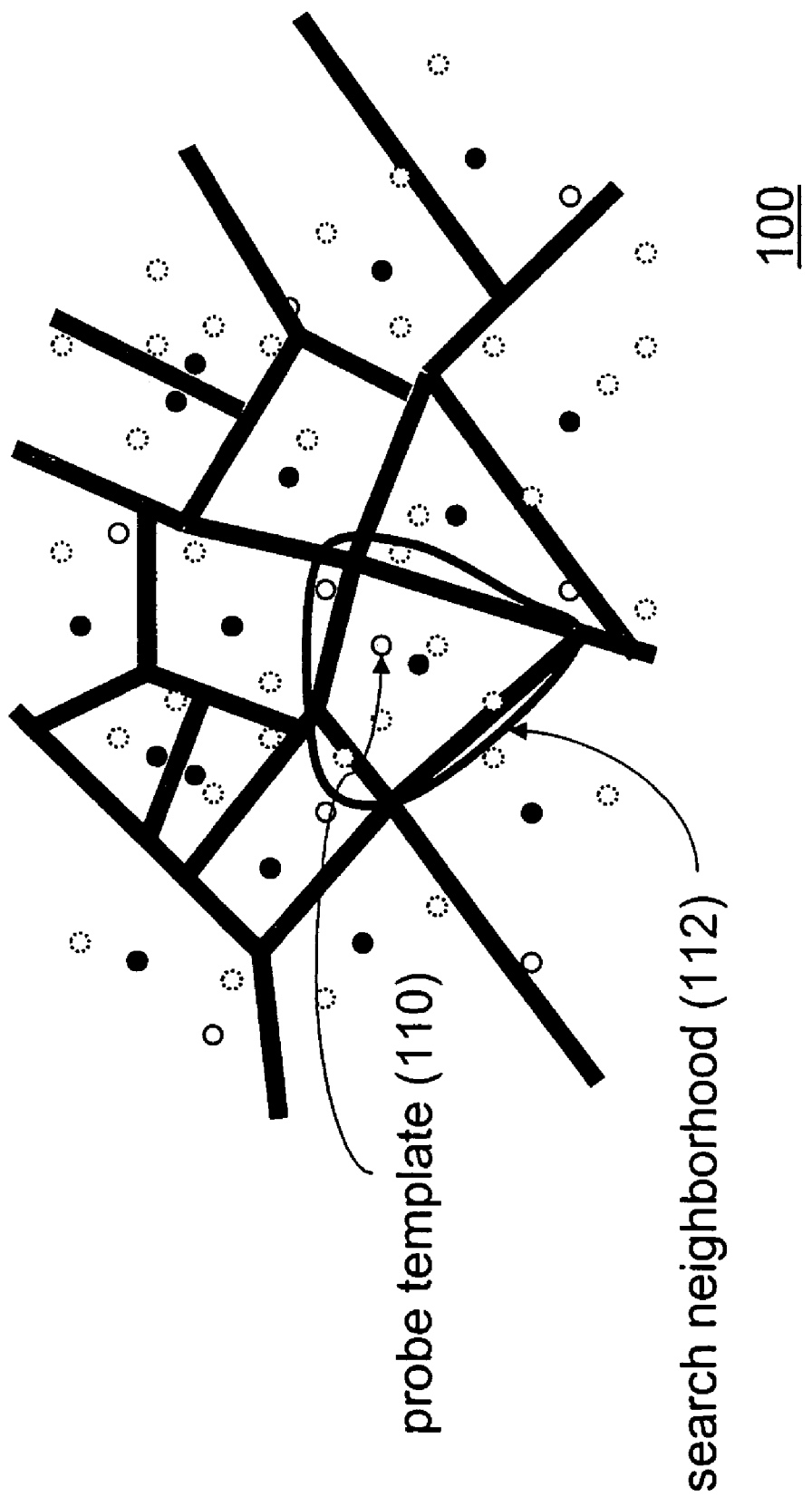

Once the gallery is clustered as such, it can be searched for a match to a probe template (e.g., a template acquired from a person for whom a match is being sought). FIG. 1D illustrates an example of a probe template 110. First, the location and cluster membership for the probe template is determined. Only that cluster or neighborhood of clusters needs to be searched, as denoted by the search neighborhood 112.

With a multi-decision tree classification system, the matching stage may be accommodated by testing the multi-decision trees with the probe template to find the leaf nodes that it is assigned to. The gallery members assigned to each of these nodes then form the cluster or subset of the gallery that should be exhaustively searched for the best matches. The gallery subset can even be ranked, based on the number of leaves assigned to each gallery entry, so that more likely matches can be tested first and the exhaustive search can be abandoned early if lower ranked members of the cluster fail to result in acceptable matches.

One useful feature with this approach is that the same similarity metric that is used to form the clusters is also used to determine matches. In typical conventional systems, a first similarity metric is used for coarse clustering to produce a set of remaining templates, and then a second, more precise metric is applied to the remaining templates. By contrast, according to this aspect of the present invention, the same metric is used for clustering and matching. For example, if a first type of similarity metric is used for clustering, it is also preferably used for matching. The resulting clusters are overlapping so the clustering should not cause false non-matches.

Figure 2:
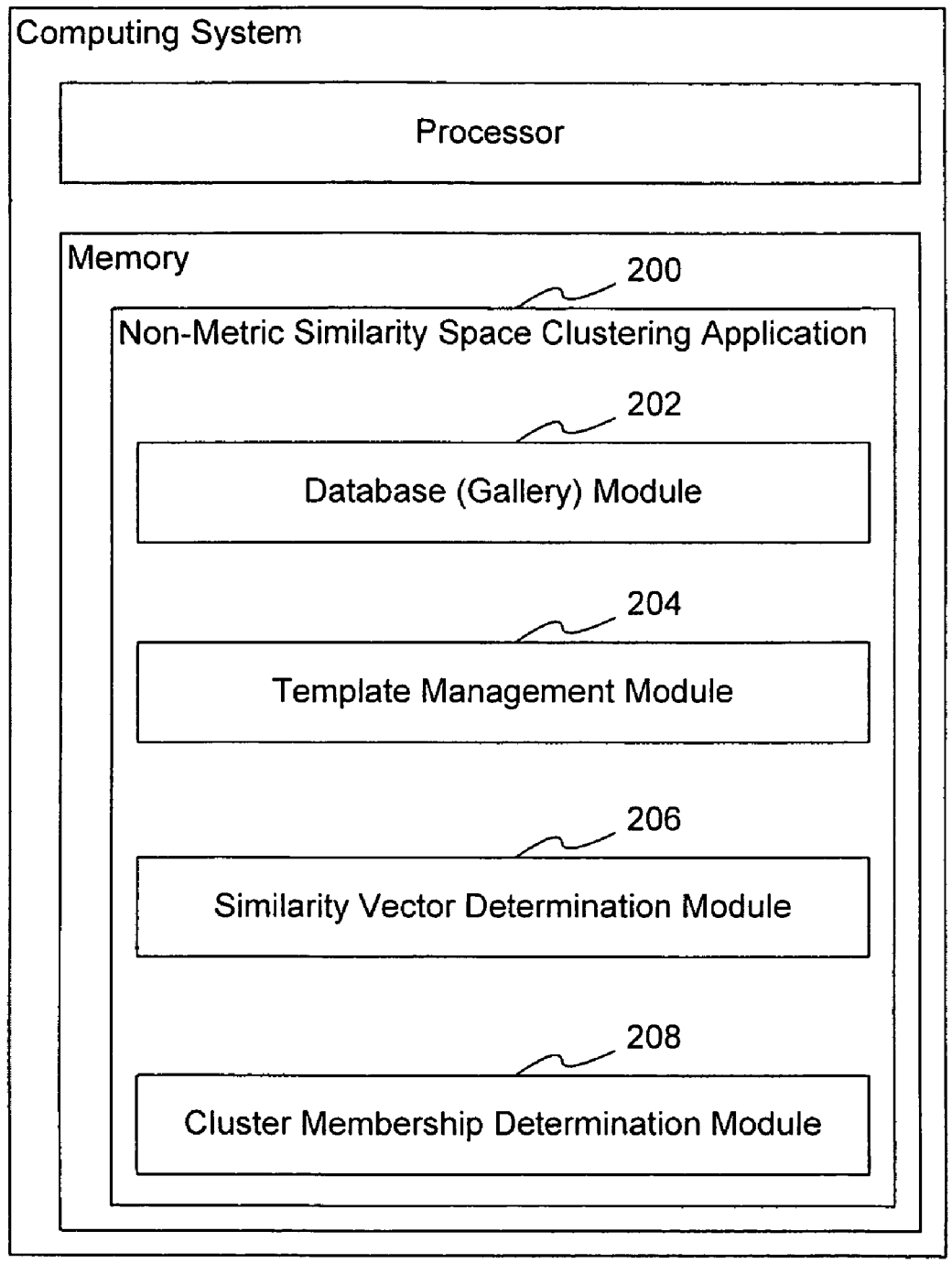
FIG. 2 is a block diagram illustrating an example of a non-metric similarity space clustering application in accordance with the present invention.

FIG. 2 is a block diagram illustrating an example of a non-metric similarity space clustering application 200 in accordance with the present invention.

The non-metric similarity space clustering (NSSC) application 200 runs on a conventional operating system in memory and carries out the described functionality by execution of computer instructions. The artisan will readily recognize the various alternative programming languages and execution platforms that are and will become available, and the present invention is not limited to any specific execution environment.

Although the NSSC application 200 is preferably provided as software, it may alternatively be hardware, firmware, or any combination of software, hardware and firmware. Although one modular breakdown is described, such is provided by way of example only, as the functionality of the NSSC application 200 may be provided in any number of alternative designs having greater, fewer or differently named component modules.

In one embodiment, a computer system includes the NSSC application 200 resident in memory on a conventional computer system, with the NSSC application 200 including instructions that are executed by a processor. Alternative embodiments include an article of manufacture wherein the instructions are stored on a computer readable storage medium. The medium may be of any type, including but not limited to magnetic storage media (e.g., floppy disks, hard disks), optical storage media (e.g., CD, DVD), and others. Still other embodiments include computer implemented processes described in connection with the NSSC application 200 as well as the corresponding flow diagrams.

The NSSC application 200 includes a database module 202, a template management module 204, a similarity vector determination module 206, and a cluster membership determination module 208.

The database module 202 stores and maintains the gallery of templates that comprise the non-metric similarity space. For example, the database module 202 may store hundreds, thousands or millions of templates corresponding to unique individual fingerprints. Although the database module 202 is shown to reside within the NSSC application 200, it should be understood that a large database as such may be separately stored for access by the NSSC application 200, and as such the illustration is merely to indicate that the data is accessible by the NSSC application 200.

The template management module 204 is in communication with the database module 202 and accommodates the determination and management of the templates used to ultimately partition the non-metric similarity space into clusters, including the fiduciary templates and the cluster seed templates.

The similarity vector determination module 206 is in communication with the template management module 204 and forms the similarity vectors through comparison of members of the sets of fiduciary and cluster seed templates.

The cluster membership determination module 208 is in communication with the database module 202 and the similarity vectors and engages in the partitioning of the non-metric similarity space into clusters by processing the similarity vectors and then applying what is learned from the similarity vectors to (preferably but not necessarily all of) the remainder of the templates in the gallery, which provides a fully clustered gallery that can be searched as described further below.

Figure 3:
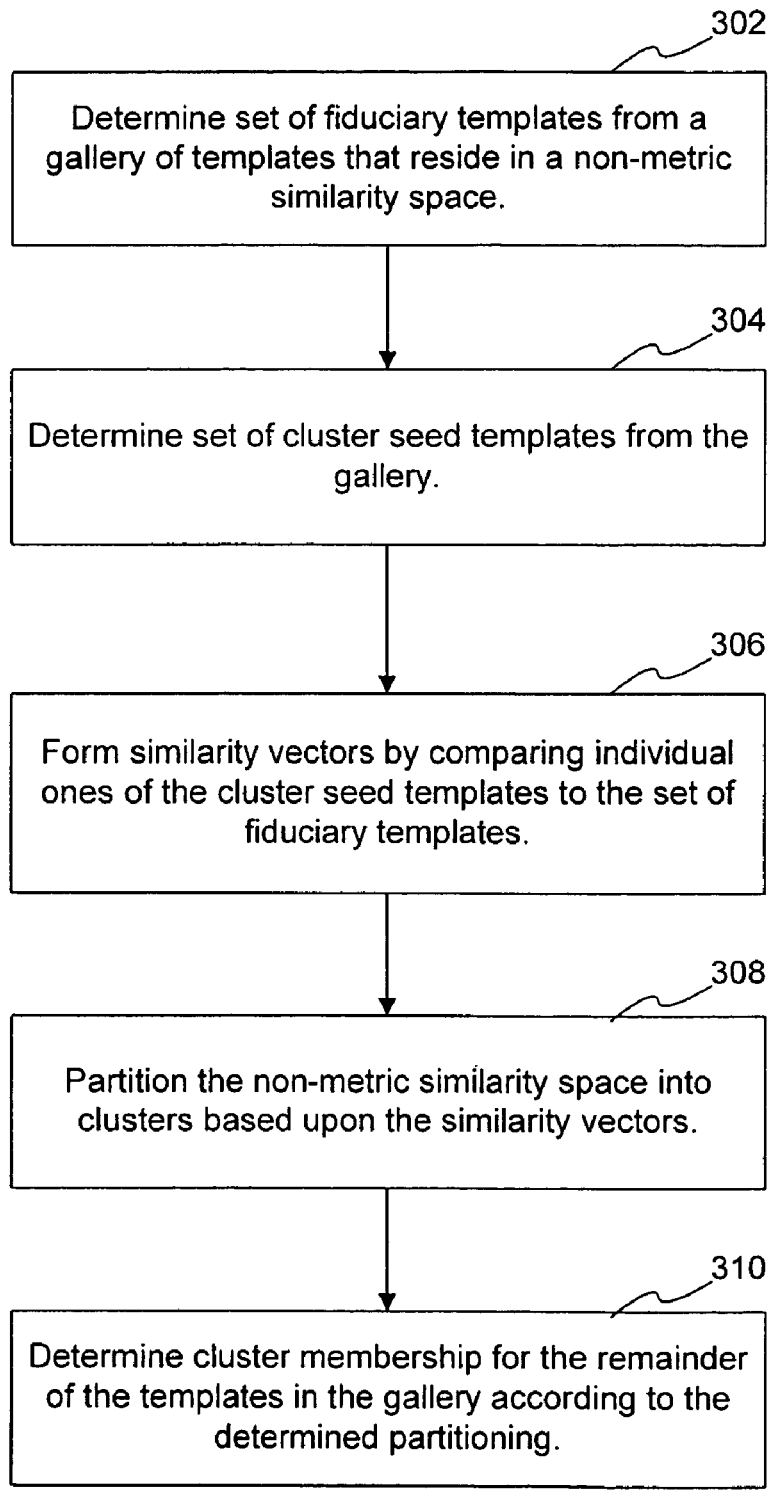
FIG. 3 is a flow diagram illustrating an example of a process for clustering a non-metric similarity space in accordance with the present invention.

The functionality of the NSSC application 200 is now further described with concurrent reference to FIG. 3, which is a flow diagram illustrating an example of a process 300 for clustering a non-metric similarity space in accordance with the present invention.

The process 300 as illustrated initiates with a determination 302 of the set of fiduciary templates from a gallery of templates, such as a full database of fingerprint or other biometric information based templates. The determination 302 preferably maximizes intra-set dispersion. This may be done by randomly determining several candidate sets from the gallery, and using the set of fiduciary templates with the highest sum of pair-wise distances between individual templates.

Cluster seed templates are then also determined 304 from the gallery. Preferably, the cluster seed templates are also randomly selected from the templates in the gallery. Since the membership size of the set of cluster seed templates is large relative to the set of fiduciary templates, random selection may be adequate for ensuring a good dispersion. Additional techniques such as those described above for the fiduciary templates may be used to further ensure dispersion.

Similarity vectors are then formed 306 by comparing individual ones of the cluster seed templates to each of the fiduciary templates. Each similarity vector basically indicates the similarity of a given cluster seed template to respective ones of the set of fiduciary templates. Basically, this similarity vector defines the location (similarity) of the cluster seed template vis-á-vis each individual fiduciary template separately. The location of any cluster seed template can be defined according to the similarity vector equation described above.

The similarity vectors are then processed to partition 308 the non-metric similarity space into clusters, and ultimately to determine 310 cluster membership for the remainder of the templates in the gallery.

Although various classifiers may be implemented to perform the partitioning 308, one approach uses a supervised machine learning algorithm that is trained with the set of similarity vectors, and preferably implements a multi-decision tree classification system.

The clusters are then populated 310 by determining the cluster membership for the remaining templates in the gallery, preferably using the same methodology that was used for partitioning 308. Where a multi-decision tree classification system is implemented, the remainder of the gallery can be populated by finding the leaf nodes where each template in the gallery is assigned by using the classification system in test mode.

Once this process 300 is completed, the gallery is partitioned into clusters and is available for access to determine matching to a template probe (e.g., from a subject to be matched or identified). According to another aspect of the present invention, the same metric that was used to cluster the gallery may also be used in the matching stage.

Figure 4:
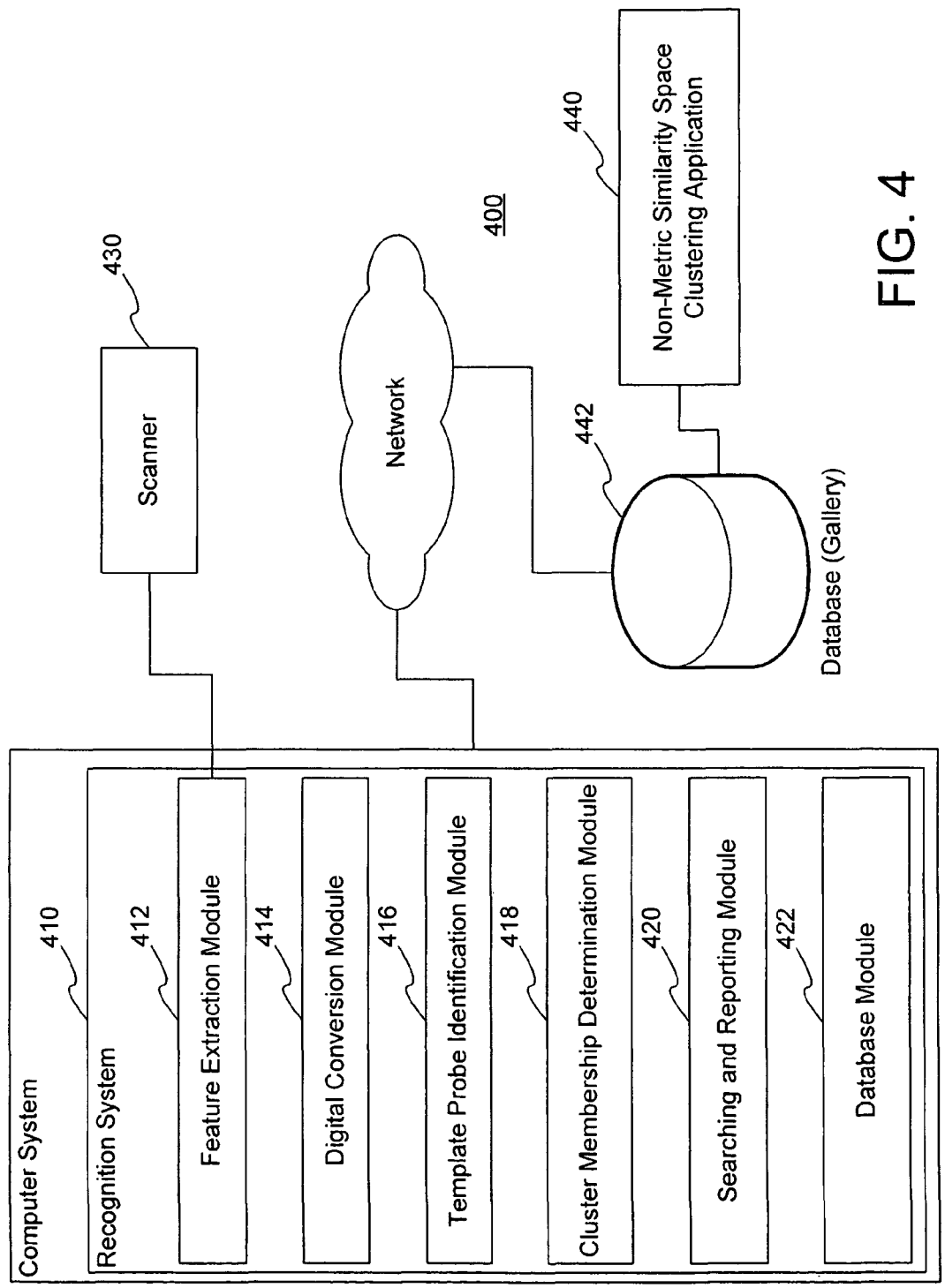
FIG. 4 is a block diagram illustrating a recognition system that searches a non-metric similarity space that is partitioned into clusters in accordance with the present invention.

FIG. 4 is a block diagram illustrating a system 400 that includes a recognition application 410 for searching a non-metric similarity space.

As with the NSSC application, the recognition application 410 runs on a conventional operating system in memory and carries out the described functionality by execution of computer instructions, and is preferably provided as software. Although one modular breakdown is described, the functionality of the recognition application 410 may be provided in any number of alternative designs having greater, fewer or differently named component modules. The recognition application 410 functionality may be provided in the context of a computer system that includes the application, an article of manufacture (e.g., storage media) that stores the corresponding software, or a computer-implemented process.

The computer system on which the recognition application 410 resides also connects to a scanner 430 that is used to collect information from a subject. For example, the scanner may be a conventional fingerprint scanning device that incorporates a CCD or other image capturing device for capturing a pattern corresponding to the fingerprint of a subject. The scanner 430 may alternatively be any device that is used to collect biometric information from a subject, including the various alternative biometric examples described above.

The recognition application 410 also communicates with the gallery of templates, such as stored in a database 442. An NSSC application 440 preferably uses the above-described metric for partitioning the gallery into clusters. Although a network connection is shown between the recognition application 410 and the database 442, this is just an example of a system 400 configuration. The network may be a private local area network, or may implement public components including the Internet. In lieu of a network connection, the database may alternatively be accessible from within a stand-alone type system, such as one that retains the database on-location at a security checkpoint.

The recognition application 410 includes a feature extraction module 412, a digital conversion module 414, a template probe identification module 416, a cluster membership determination module 418, a searching and reporting module 420 and a database management module 422.

The database management module 422 manages the data that will be processed by the system and communicates with the database 422 that stores the gallery accordingly. Depending upon the size of the gallery and the particular application, the database management module 422 may also store all or part of the gallery at any given time.

The feature extraction module 412 uses conventional techniques to extract information from the scanned image to build at least one template corresponding to the subject. For a fingerprint scan, this may involve determination of patterns and minutiae from the scanned image. The template probe module 416 stores the template probe corresponding to the subject.

The cluster membership determination module 418 determines which cluster the template probe belongs to, and the searching and reporting module 420 then searches the gallery based upon the membership determination. The search is thereby limited to the cluster that the template probe is determined to be a member of (or a relatively small neighborhood of clusters corresponding to the determined cluster). The reporting may be a return of a single best match, or other types of reports including but not limited to a ranked listing of potential matches.

Figure 5:
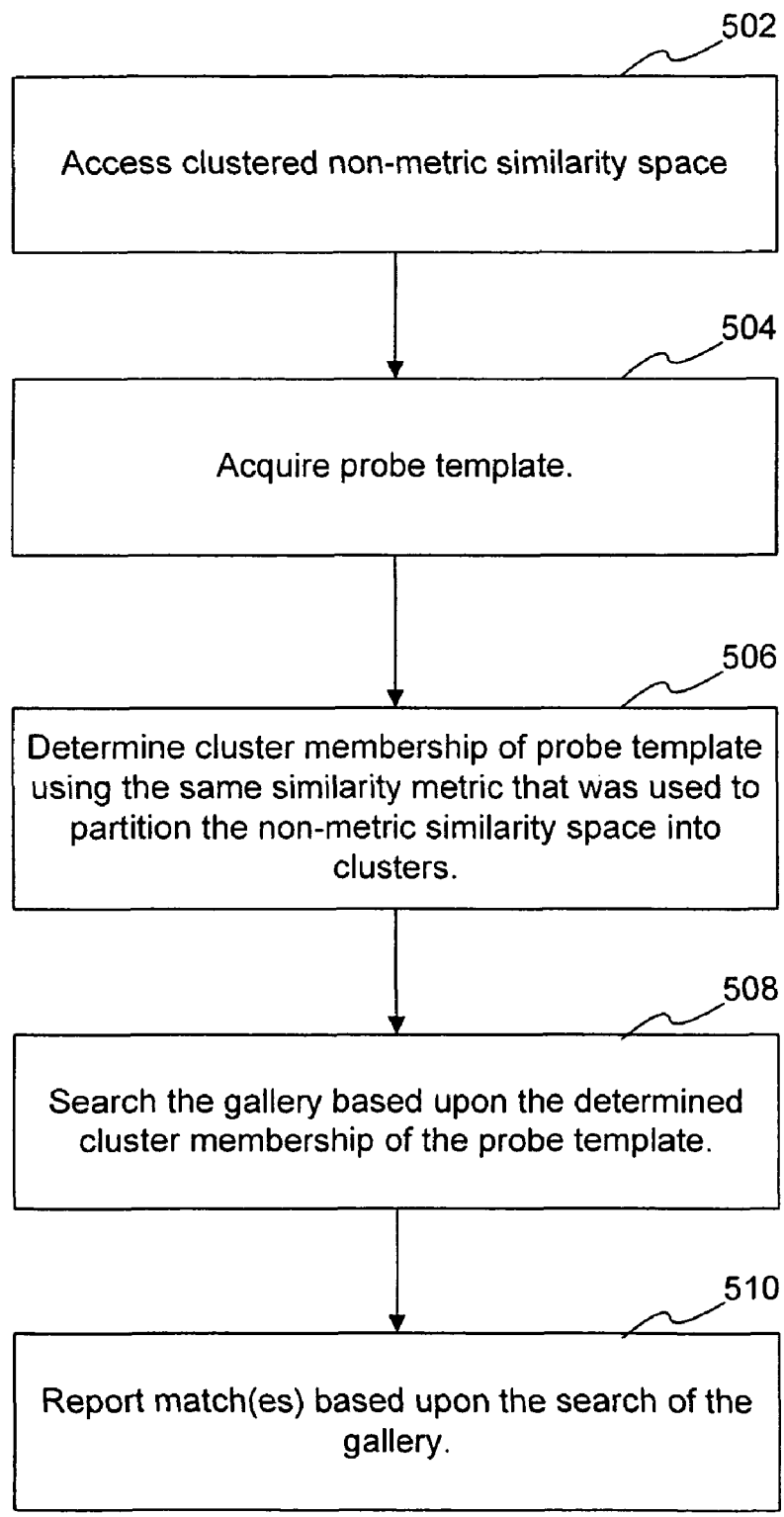
FIG. 5 is a flow diagram illustrating an example of a process for searching the non-metric similarity space and reporting the search results in accordance with the present invention.

FIG. 5 is a flow diagram illustrating an example of a process for searching the non-metric similarity space and reporting the search results in accordance with the present invention.

The process 500 includes access 502 to the non-metric similarity space, in the form of the gallery that is partitioned into clusters. A probe template is acquired 504, such as by scanning and processing the captured data to build the template probe as described.

The cluster membership of the probe template is then determined 506. With a multi-decision tree classification system, the determination 506 is accommodated by testing the multi-decision trees with the probe template to find the leaf nodes that it the probe template is assigned to.

The gallery is then searched 508 based upon the determined cluster membership of the template probe. Only the cluster or neighborhood of clusters for the template probe needs to be searched. Continuing with the multi-decision tree classification system based example, the gallery members assigned to each of the nodes determined 506 above form the cluster or subset of the gallery that should be exhaustively searched for the best matches. The gallery subset can also be ranked according to the number of leaves assigned to each gallery entry, so that more likely matches can be tested first and the exhaustive search can be abandoned early if lower ranked members of the cluster fail to result in acceptable matches.

Finally, the matching as determined based upon the search 508 is reported 510 such as on a display or printout for the user to review.

It should be appreciated that the present invention is not limited to multi-decision tree classification systems. For example, with a neural network based approach, a determination of which nodes in the output layer get activated may be used to determine cluster membership.

Thus embodiments of the present invention produce and provide for the partitioning of non-metric similarity spaces such as those based upon biometric information, for more efficient matching. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A non-transitory computer readable medium having stored thereon instructions which cause a processor to implement a method for clustering biometric templates, the method comprising:
   determining a set of fiduciary templates from a gallery of biometric templates, the biometric templates being stored in a database;
   determining a set of cluster seed templates from the gallery of biometric templates, the membership of the set of cluster seed templates being relatively large in number as compared to the set of fiduciary templates;
   forming a plurality of similarity vectors by comparing members of the set of cluster seed templates to the set of fiduciary templates, wherein individual ones of the similarity vectors indicate the similarity of a given member of the set of cluster seed templates to respective ones of the set of fiduciary templates; and
   partitioning the gallery of biometric templates into clusters based upon the plurality of similarity vectors.

2. The non-transitory computer readable medium of claim 1, further comprising instructions for:
   populating the clusters using a remainder of the templates in the gallery other than the fiduciary templates and the cluster seed templates.

3. The non-transitory computer readable medium of claim 1, wherein partitioning is performed by applying a classifier to the plurality of similarity vectors, and the classifier implements a supervised machine learning algorithm that is trained with the plurality of similarity vectors.

4. The non-transitory computer readable medium of claim 1, wherein partitioning is performed by applying a classifier to the plurality of similarity vectors, and the classifier implements a multi-decision tree classification system.

5. The non-transitory computer readable medium of claim 4, further comprising instructions for:
   accessing a probe template and determining a set of leaf nodes that the probe template is assigned to according to the multi-decision tree classification system;
   determining a cluster neighborhood for the probe template to be those members of the gallery of biometric templates that are assigned to the set of leaf nodes; and
   searching the cluster neighborhood to determine whether the gallery includes a match corresponding to the probe template.

6. The non-transitory computer readable medium of claim 1, further comprising instructions for:
   accessing a probe template;
   determining a cluster neighborhood for the probe template, the cluster neighborhood corresponding to the partitioning of the gallery; and
   searching the cluster neighborhood to determine whether the gallery includes a match corresponding to the probe template.

\* \* \* \* \*